United States Patent [19]

Muehlbach et al.

[11] Patent Number: 5,260,359
[45] Date of Patent: Nov. 9, 1993

[54] HIGH IMPACT FLAMEPROOFED POLYPHENYLENE ETHER-POLYAMIDE MOLDING MATERIALS

[75] Inventors: Klaus Muehlbach, Gruenstadt; Peter Steiert, Ludwigshafen; Wilfried Vogel, Dannstadt-Schauernheim; Armin Kurps, Boehl-Iggelheim, all of Fed. Rep. of Germany

[73] Assignee: BASF Aktiengesellschaft, Ludwigshafen, Fed. Rep. of Germany

[21] Appl. No.: 940,329

[22] Filed: Sep. 3, 1992

[30] Foreign Application Priority Data

Sep. 5, 1991 [DE] Fed. Rep. of Germany ....... 4129500

[51] Int. Cl.⁵ .............................................. C08K 3/02
[52] U.S. Cl. ........................................ 524/80; 524/95; 524/114; 524/198; 524/218; 524/414; 524/505; 524/606
[58] Field of Search ............... 524/80, 414, 505, 95, 524/114, 198, 218, 606

[56] References Cited

U.S. PATENT DOCUMENTS

| | | | |
|---|---|---|---|
| 4,242,254 | 12/1980 | Abolins | 260/40 R |
| 5,049,599 | 9/1991 | Steiert et al. | 524/80 |
| 5,104,937 | 4/1992 | Saito et al. | 525/89 |

FOREIGN PATENT DOCUMENTS

| | | |
|---|---|---|
| 129825 | 1/1985 | European Pat. Off. |
| 0234063 | 9/1987 | European Pat. Off. |
| 0236593 | 9/1987 | European Pat. Off. |
| 384232 | 2/1990 | European Pat. Off. |
| 3831992 | 3/1990 | Fed. Rep. of Germany |

OTHER PUBLICATIONS

*Patent Abstracts of Japan;* vol. 14, No. 232 (C-0719), May 17, 1990.
Chem Abst. JP 6 3089-567-A.
Chem Abst. JP 6 3048-356-A.

*Primary Examiner*—Kriellion S. Morgan

[57] ABSTRACT

Flameproofed thermoplastic molding materials comprises

A) from 5 to 93.5% by weight of a thermoplastic polyamide,
B) from 5 to 85% by weight of a polyphenylene ether, of which up to 40% by weight, based on B), may be replaced by an aromatic vinyl polymer,
C) from 0.5 to 20% by weight of red or black phosphorus,
D) from 1 to 20% by weight of a block copolymer which has a Shore A hardness > 80 and has been formed from a conjugated diene and an aromatic vinyl compound,
E) from 0 to 15% by weight of an impact modifying polymer other than D),
F) from 0 to 45% by weight of a fibrous or particulate filler or a mixture of a fibrous with a particulate filler,
G) from 0 to 20% by weight of customary additives in effective amounts, the percentages A) to G) adding up to 100%.

7 Claims, No Drawings

HIGH IMPACT FLAMEPROOFED POLYPHENYLENE ETHER-POLYAMIDE MOLDING MATERIALS

The present invention relates to flameproofed thermoplastic molding materials comprising A) from 5 to 93.5% by weight of a thermoplastic polyamide,
B) from 5 to 85% by weight of a polyphenylene ether, of which up to 40% by weight, based on B), may be replaced by an aromatic vinyl polymer,
C) from 0.5 to 20% by weight of red or black phosphorus,
D) from 1 to 20% by weight of a block copolymer which has a Shore A hardness > 80 and has been formed from a conjugated diene and an aromatic vinyl compound,
E) from 0 to 15% by weight of an impact modifying polymer other than D),
F) from 0 to 45% by weight of a fibrous or particulate filler or a mixture of a fibrous with a particulate filler,
G) from 0 to 20% by weight of customary additives, the percentages A) to G) adding up to 100%.

The present invention also relates to the use of these molding materials for producing shaped articles and to the shaped articles obtainable therefrom.

DE-A 38 31 992 and U.S. Pat. No. 4,242,254 disclose polyphenylene ether-polyamide molding materials comprising a mixture of halogen-containing flameproofing agents, red phosphorus and stabilizers. However, halogen-containing compounds are disadvantageous from an environmental point of view, since the burning of such plastics gives rise to highly toxic organic products.

Phosphorus-containing compounds are used as flameproofing agents for PPE-PA blends are known from EP-A 129 825. The effectiveness of these compounds is insufficient, so that very large amounts need to be used thereof for UL 94 compliance.

Since compounds such as triphenyl phosphate can also be used as plasticizers, the addition of large quantities leads to a deterioration in the mechanical properties, for example the toughness and heat resistance, of such molding materials.

The addition of red phosphorus is known from EP-A 384 232, JP-A 63/089567 and JP-A 63/048356. However, the toughness properties of these molding materials are in need of improvement.

More particularly, utility for some purposes is also crucially dependent on the fracture characteristics of damaged articles. Not just a high flame resistance rating is required but also a very large plastic deformation before fracture (ductile fracture).

It is an object of the present invention to make available thermoplastic PPE-PA molding materials which with the addition of a very small amount of flameproofing agent possess not only good flame resistance properties but also very good toughness properties.

We have found that this object is achieved by the thermoplastic molding materials defined in the opening paragraph. Preferred materials of this kind and a use thereof are revealed in subclaims.

As component A) the molding materials according to the present invention contain from 5 to 93.5, preferably from 30 to 71, in particular from 35 to 65, % by weight of a thermoplastic polyamide.

The polyamides used as component A) are known per se and include the partly crystalline and amorphous resins having weight average molecular weights of at least 5000 which are usually referred to as nylons. Such polyamides are described for example in U.S. Pat. Nos. 2,071,250, 2,071,251, 2,130,523, 2,130,948, 2,241,322, 2,312,966, 2,512,606 and 3,393,210.

The polyamides can be prepared for example by condensation of equimolar amounts of a saturated or aromatic dicarboxylic acid of from 4 to 12 carbon atoms with a saturated or aromatic diamine of 14 carbon atoms or by condensation of ω-aminocarboxylic acids or polymerization of lactams.

Examples of polyamides are polyhexamethyleneadipamide (nylon 66), polyhexamethyleneazelamide (nylon 69), polyhexamethylenesebacamide (nylon 610), polyhexamethylenedodecanediamide (nylon 612), the polyamides obtained by ring opening of lactams such as polycaprolactam (nylon 6) and polylaurolactam, and also poly-11-aminoundecanoic acid and a polyamide of di(p-aminocyclohexyl)methane and dodecanedioic acid.

It is also possible to carry out the present invention using polyamides prepared by copolycondensation of two or more of the abovementioned polymers or components thereof, for example copolymers of adipic acid, isophthalic acid or terephthalic acid and hexamethylenediamine (nylon 66/6T) or copolymers of caprolactam, terephthalic acid and hexamethylenediamine (nylon 6/6T). Such portly aromatic copolyamides contain from 40 to 90% by weight of units derived from terephthalic acid and hexamethylenediamine. A small proportion of the terephthalic acid, preferably not more than 20% by weight of the total aromatic dicarboxylic acid used, may be replaced by isophthalic acid or other aromatic dicarboxylic acids, preferably those in which the carboxyl groups are para-disposed.

As well as units derived from terephthalic acid and hexamethylenediamine, the partly aromatic copolyamides contain units derived from ε-caprolactam and/or units derived from adipic acid and hexamethylenediamine.

The proportion of units derived from ε-caprolactam is up to 50% by weight, preferably from 20 to 50% by weight, in particular from 25 to 40% by weight, while the proportion of units derived from adipic acid and hexamethylenediamine is up to 60% by weight, preferably from 30 to 60% by weight, in particular from 35 to 55% by weight.

The copolyamides may contain not only units of ε-caprolactam but also units of adipic acid and hexamethylenediamine; in this case it has to be ensured that the proportion of units which are free of aromatic groups is not less than 10% by weight, preferably not less than 20% by weight. In this case, the ratio of units derived from ε-caprolactam on the one hand and from adipic acid and hexamethylenediamine on the other is not subject to any particular restriction.

Of particular advantage for many purposes are polyamides containing from 50 to 80, in particular from 60 to 75, % by weight of units derived from terephthalic acid and hexamethylenediamine and from 20 to 50, preferably from 25 to 40, % by weight of units derived from ε-caprolactam.

Of particular advantage for ternary copolyamides are compositions of from 50 to 70% by weight of units derived from terephthalic acid and hexamethylenediamine and from 10 to 20% by weight of units derived from adipic acid and hexamethylenediamine and also from 20 to 30% by weight of units derived from isophthalic acid and hexamethylenediamine.

The partly aromatic copolyamides may be prepared for example by the process described in EP-A-129 195 and P 129 196.

Preference is given to linear polyamides having a melting point above 200° C.

Preferred polyamides are polyhexamethyleneadipamide, polyhexamethylenesebacamide and polycaprolactam and also nylon 6/6T and nylon 66/6T. The polyamides have in general a relative viscosity of from 2.0 to 5, determined on a 1% by weight solution in 96% sulfuric acid at 23° C., which corresponds to a molecular weight of from about 15,000 to 45,000. Polyamides having a relative viscosity of from 2.4 to 3.5, in particular from 2.5 to 3.4, are used with preference.

It is also possible to use polyamides which are obtainable for example by condensation of 1,4-diaminobutane with adipic acid at elevated temperature (nylon-4,6). Methods for preparing polyamides of this structure are described for example in EP-A 38 094, EP-A 38 582 and EP-A 39 524.

It is also possible to use mixtures of different polyamides.

As component B) the molding materials according to the present invention contain from 5 to 85, preferably from 25 to 65, in particular from 30 to 65, % by weight of a polyphenylene ether.

The polyphenylene ethers generally have a weight average molecular weight within the range from 10,000 to 80,000, preferably from 20,000 to 60,000, in particular from 40,000 to 55,000.

This corresponds to a reduced specific viscosity $\eta_{red}$ of from 0.2 to 0.9 dl/g, preferably of from 0.35 to 0.8, in particular from 0.45 to 0.6, measured in a 0.5% by weight solution in chloroform at 25° C.

The unmodified polyphenylene ethers $b_1$) are known per se and are preferably prepared by oxidative coupling of ortho-disubstituted phenols.

Examples of substituents are halogen atoms such as chlorine or bromine and alkyl radicals of from 1 to 4 carbon atoms which preferably have no α-disposed tertiary hydrogen atom, e.g. methyl, ethyl, propyl or butyl. The alkyl radicals may in turn be substituted by halogen atoms such as chlorine or bromine or by hydroxyl. Further examples of possible substituents are alkoxy radicals, preferably of up to 4 carbon atoms, or unsubstituted or halogen- and/or alkyl-substituted phenyl radicals. It is similarly possible to use copolymers of various phenols, for example copolymers of 2,6-dimethylphenol and 2,3,6-trimethylphenol. It is of course also possible to use mixtures of various polyphenylene ethers.

The polyphenylene ethers used as component $b_1$) may contain process-induced flaws as described for example by White et al., Macromolecules 23 (1990), 1318-29.

Preference is given to using those polyphenylene ethers which are compatible with, i.e. wholly or substantially soluble in, aromatic vinyl polymers (cf. A. Noshay, Block Copolymers, pages 8 to 10, Academic Press, 1977, and O. Olabisi, Polymer-Polymer Miscability, 1979, pages 117 to 189).

Examples of polyphenylene ethers are poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly-(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2,6-dibenzyl-1,4-phenylene ether), poly(2-ethoxy-1,4-phenylene ether), poly-(2-chloro-1,4-phenylene ether), poly(2,5-dibromo-1,4-phenylene ether). Preference is given to using polyphenylene ethers where the substituents are alkyl radicals of from 1 to 4 carbon atoms, such as poly-(2,6-dimethyl-1,4-phenylene ether), poly(2,6-diethyl-1,4-phenylene ether), poly(2-methyl-6-ethyl-1, 4-phenylene ether), poly(2-methyl-6-propyl-1,4-phenylene ether), poly(2,6-dipropyl-1,4-phenylene ether) and poly(2-ethyl-6-propyl-1,4-phenylene ether).

It is further possible to use graft copolymers formed from polyphenylene ethers and aromatic vinyl monomers such as styrene, a-methylstyrene, vinyltoluene and chlorostyrene.

Functionalized or modified polyphenylene ethers are known per se, for example from WO-A 86/02086, WO-A 87/00540, EP-A-222 246, EP-A-223 116 and EP-A-254 048.

Customarily, an unmodified polyphenylene ether $b_1$) is modified by incorporation of at least one carbonyl, carboxyl, anhydride, amide, imide, carboxylic ester, carboxylate, amino, hydroxyl, epoxy, oxazoline, urethane, urea, lactam or halobenzyl group to ensure adequate compatibility with the polyamide (component A).

The modification is in general carried out by reacting an unmodified polyphenylene ether b,) with a modifier which contains at least one of the abovementioned groups and at least one C—C double or C—C triple bond, in solution (WO-A 86/2086), in aqueous dispersion, in a gas phase process (EP-A-25 200) or in the melt in the presence or absence of suitable aromatic vinyl polymers or tougheners with or without free radical initiators.

Suitable modifiers ($b_3$) are for example maleic acid, methylmaleic acid, itaconic acid, tetrahydrophthalic acid, anhydrides and amides thereof, fumaric acid, the mono- and diesters of these acids, for example with $C_1$- and $C_2$- to $C_8$-alkanols ($b_{31}$), the mono- and diamides of these acids such as N-phenylmaleimide (monomer $b_{32}$), maleohydrazide. It is also possible to use for example N-vinylpyrrolidone and (meth)acryloylcaprolactam ($b_{33}$).

Another group of modifiers includes for example the acid chloride of trimellitic anhydride, 4-acetoxycarbonyl-1,2-phthalic anhydride, pyromellitic anhydride, chloroethanoylsuccinaldehyde, chloroformylsuccinaldehyde, citric acid and hydroxysuccinic acid.

Preference is given to using as component B) in the molding materials according to the present invention a modified polyphenylene ether which is obtainable by reacting $b_1$) from 70 to 99.95, preferably from 76.5 to 99.94, % by weight of an unmodified polyphenylene ether, $b_2$) from 0 to 40, preferably from 0 to 20, % by weight of an aromatic vinyl polymer, $b_3$) from 0.05 to 10, preferably form 0.05 to 5, % by weight of at least one compound of the group consisting of $b_{31}$) an $\alpha,\beta$-unsaturated dicarbonyl compound, $b_{32}$) an amido-containing monomer having a polymerizable double bond, and $b_{33}$) a lactamo-containing monomer having a polymerizable double bond, b4) from 0 to 5, preferably from 0.01 to 0.09, % by weight of a free radical initiator,
the weight percentages being based on the sum total of b1) to b4), in the course of 0.5 to 15 minutes at from 240° to 375° C. in suitable mixing and kneading apparatus such as twin-screw extruders.

The aromatic vinyl polymer b2) should preferably be compatible with the polyphenylene ether used.

The molecular weight of these polymers, which are known per se, is in general within the range from 1500 to 2,000,000, preferably within the range from 70,000 to 1,000,000.

Examples of preferred aromatic vinyl polymers which are compatible with polyphenylene ethers may be found in the abovementioned monograph by Olabisi, pages 224 to 230 and 245. Merely representative examples are aromatic vinyl polymers resulting from styrene, chlorostyrene, α-methylstyrene and p-methylstyrene; minor amounts (preferably not more than 20, in particular not more than 8, % by weight) can also be present of comonomers such as (meth)acrylonitrile or (meth)acrylic esters. Particularly preferred aromatic vinyl polymers are polystyrene and high impact polystyrene. It is of course also possible to use mixtures of these polymers. The preparation is preferably effected by the process described in EP-A-302 485.

Examples of free radical initiators b4) are: di(2,4-dichlorobenzoyl) peroxide, tert-butyl peroxide, di(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butyl peroxy-3,3,5-trimethylcyclohexane, tert-butyl peroxyisopropylcarbonate, tert-butyl peroxy-3,3,5-trimethylhexanoate, tert-butyl peracetate, tertbutyl perbenzoate, butyl 4,4-di-tert-butyl peroxyvalerate, 2,2-di-tert-butylperoxybutane, dicumyl peroxide, tert-butyl cumyl peroxide, 1,3-di(tert-butylperoxyisopropyl)benzene, and di-tert-butyl peroxide. It is also possible to use organic hydroperoxides such as diisopropylbenzene monohydroperoxide, cumene hydroperoxide, tert-butyl hydroperoxide, p-menthyl hydroperoxide and pinane hydroperoxide and also highly branched alkanes of the general structure

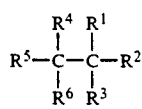

where $R^1$ to $R^6$ are alkyl groups of from 1 to 8 carbon atoms, alkoxy groups of 1 to 8 carbon atoms, aryl groups such as phenyl, naphthyl or 5- or 6-membered heterocycles having a π-electron system and nitrogen, oxygen or sulfur as hetero atoms. The substituents $R^1$ to $R^6$ May each in turn contain functional groups as substituents, such as carboxyl, carboxyl derivative, hydroxyl, amino, thiol or epoxy groups. Examples are 2,3-dimethyl-2,3-diphenylbutane, 3,4-dimethyl-3,4-diphenylhexane and 2,2,3,3-tetraphenylbutane.

Particularly preferred polyphenylene ethers B) for the molding materials according to the present invention are obtained by modification with maleic acid, maleic anhydride and fumaric acid. Such polyphenylene ethers preferably have an acid number of from 1.8 to 3.2, in particular from 2.0 to 3.0.

The acid number is a measure of the degree of modification of the polyphenylene ether and is in general determined by titration with bases under inert gas conditions.

The acid number corresponds in general to the amount of base in mg which is required for neutralizing 1 g of a thus acid-modified polyphenylene ether B) (according to DIN 53 402).

The molding materials according to the present invention contain as component C) from 1 to 20% by weight, preferably from 1 to 10, in particular from 1 to 6, % by weight of red or black phosphorus.

The preferred flameproofing agent (C) is elemental red phosphorus, which can be used in untreated form.

However, of particular suitability are preparations in which the phosphorus has been coated at the surface with low molecular weight liquid substances such as silicone oil, paraffin oil or esters of phthalic acid or adipic acid or with polymeric or oligomeric compounds, e.g. with phenolic or amino resins and polyurethanes.

It is also possible to use masterbatches of red phosphorus, for example in a polyamide or elastomer. Particularly suitable masterbatch polymers are polyolefin homopolymers and copolymers. However, the proportion of masterbatch polymer in the molding material according to the invention should not be more than 35% by weight, based on the weight of components (A) to (D).

The median particle size ($d_{50}$) of the phosphorus particles dispersed in the molding materials is preferably within the range from 0.0001 to 0.5 mm, in particular from 0.001 to 0.2 mm.

As component D) the thermoplastic molding materials according to the present invention contain from 1 to 20 preferably from 3 to 18, in particular from 4 to 12, % by weight of a block copolymer of a conjugated diene and an aromatic vinyl compound and which has a Shore A hardness > 80, preferably > 82, in particular > 85.

The Shore A hardness is measured as laid down in DIN 53 505. In general, the hardness of the elastomer is taken to mean the measured value of the resistance of an elastomer to the penetration into a molding article of an implement of defined shape and size under a defined force at 23° C. Accordingly, the results obtained as measured values are integers along a relative scale ranging from 0=very soft surface to 100=very hard surface.

Block copolymers having up to six, preferably up to four, identical or different blocks, which may be linked linearly or else radially, have been found to be particularly suitable.

Preference is given to block rubbers in which at least one block, preferably two blocks, is composed of aromatic vinyl monomers such as styrene, α-methylstyrene, vinyltoluene, vinylnaphthalene or isopropenylnaphthalene. Polystyrene is particularly preferred as aromatic vinyl block, in particular as end block.

These preferred block copolymers customarily also contain an elastomeric block which is characterized by a glass transition temperature of less than −30° C. This block is derived for example from conjugated dienes such as butadiene, isoprene, 1,3-pentadiene or 2,3-dimethylbutadiene.

The transitions between the individual blocks can be not only sharp but also tapered.

The rubbers which increase the toughness of polyphenylene ethers are preferably linear block copolymers of the general structure A—B, A—B—A' or A—B—A'—B', where A and A' are each an aromatic vinyl block, preferably polystyrene, and B and B' are each an elastomeric block, which is preferably composed of butadiene and/or isoprene.

Such block copolymers are commercially available (Tufprene ® from Asahi Chem. Ind. JP).

The styrene content of the block copolymers C) is in general from 35 to 48, preferably from 38 to 45, % by weight, based on the total amount of component C).

In addition to the essential components A) to D) the molding materials according to the present invention may contain from 0 to 15, preferably from 3 to 15, in particular from 5 to 15, % by weight of an impact modified polymer E) which is different from D).

it is possible to use customary impact modifiers E) which are suitable for polyamides (component A), and rubbers E) which customarily serve to impact modify polyphenylene ethers B) but are different from C).

Examples of rubbers which increase the toughness of polyphenylene ethers are:

polyoctenylenes, graft rubbers having a cross-linked, elastomeric core, derived for example from butadiene, isoprene or alkyl acrylates, and a grafted sheath of polystyrene, also copolymers of ethylene and acrylates or methacrylates and also ethylene-propylene (EP) and ethylene-propylene-diene monomer (EPDM) rubbers, also styrene-grafted EP and EPDM rubbers.

It is also possible to use block copolymers having up to six, preferably up to four, identical or different blocks, which may be linked linearly or else radially, provided that they are different from D), i.e. have a Shore A hardness of up to 80.

It is likewise possible to use mixtures of block copolymers of different structures, for example mixtures of two- and three-block copolymers or of hydrogenated and unhydrogenated block copolymers.

Such impact modifying polymers are known per se and described in the literature, for example U.S. Pat. No. 4,085,163, U.S. Pat. No. 4,041,103, U.S. Pat. No. 3,149,182, U.S. Pat. No. 3,231,635 and U.S. Pat. No. 3,462,162.

Preference is given to molding materials which contain no further block copolymers.

Appropriate products are also available commercially, for example a polyoctylene under the designation Vestenamer ® from Hüls AG and a multiplicity of suitable block copolymers containing at least one aromatic vinyl and one elastomeric block. Examples are the Cariflex ®-TR range (Shell), the Kraton ® -G range (Shell), the Finaprene ® range (Fina) and the Europrene ®-SOL-TR range (Enichem).

Rubbers which increase the toughness of polyamides generally have two essential features: an elastomeric portion which has a glass transition temperature of less than $-10°$ C., preferably of less than $-30°$ C., and at least one functional group capable of reacting with the polyamide. Suitable functional groups are for example carboxylic acid, carboxylic anhydride, carboxylic ester, carboxamide, carboximide, amino, hydroxyl, epoxy, urethane and oxazoline groups.

Examples of rubbers which increase the toughness of polyamides are:

EP and EPDM rubbers which have been grafted with the abovementioned functional groups. Suitable grafting reagents are for example maleic anhydride, itaconic acid, acrylic acid, glycidyl acrylate and glycidyl methacrylate. These monomers can be grafted onto the polymer in the melt or in solution in the presence or absence of a free radical initiator such as cumene hydroperoxide.

Further examples are copolymers of α-olefins. The α-olefins are customarily monomers of from 2 to 8 carbon atoms, preferably ethylene and propylene. Suitable comonomers are alkyl acrylates or alkyl methacrylates derived from alcohols of from 1 to 8 carbon atoms, preferably from ethanol, butanol or ethylhexanol, and also reactive comonomers such as acrylic acid, methacrylic acid, maleic acid, maleic anhydride or glycidyl (meth)acrylate and vinyl esters, in particular vinyl acetate. It is also possible to use mixtures of different comonomers. Of particular suitability are copolymers of ethylene with ethyl or butyl acrylate and acrylic acid and/or maleic anhydride.

The copolymers can be prepared in a high pressure process at a pressure of from 400 to 4500 bar or by grafting the comonomers onto the poly-α-olefin. The proportion of α-olefin in the copolymer is in general within the range from 99.95 to 55% by weight.

A further group of suitable elastomers are coreshell graft rubbers. These are graft rubbers which are prepared in emulsion and consist of at least one hard and one soft part. The hard part customarily comprises a polymer having a glass transition temperature of at least 25° C. and the soft part a polymer having a glass transition temperature of not more than 0° C. These products have a structure with a core and at least one shell, due to the order of addition of the monomers. The soft parts are in general derived from butadiene, isoprene, alkyl acrylates or alkyl methacrylates with or without further comonomers. Suitable comonomers for this purpose are for example styrene, acrylonitrile and crosslinking or grafting monomers having more than one polymerizable double bond such as diallyl phthalate, divinylbenzene, butanediol diacrylate or triallyl (iso)cyanurate. The hard parts are in general derived from styrene, α-methylstyrene and copolymers thereof, the preferred comonomers here being acrylonitrile, methacrylonitrile and methyl methacrylate.

Preferred core-shell graft rubbers contain a soft core and a hard shell or a hard core, a first, soft shell and at least one further, hard shell. The incorporation of functional groups such as carbonyl, carboxyl, anhydride, amide, imide, carboxylic ester, amino, hydroxyl, epoxy, oxazoline, urethane, urea, lactam or halobenzyl groups is preferably effected here by the addition of suitable functionalized monomers in the course of the polymerization of the last shell. Suitable functionalized monomers are for example maleic acid, maleic anhydride, mono- and diesters of maleic acid, tert-butyl (meth)acrylate, acrylic acid, glycidyl (meth)acrylate and vinyloxazoline. The proportion of monomers having functional groups is in general from 0.1 to 25% by weight, preferably from 0.25 to 15% by weight, based on the total weight of the core-shell graft rubber. The weight ratio of soft to hard is in general from 1:9 to 9:1, preferably from 3:7 to 8:2.

Rubbers of this type, which increase the toughness of polyamides, are known per se and described for example in EP-A 208,187.

A further group of suitable impact modifiers E) are thermoplastic polyester elastomers. For the purposes of the present invention polyester elastomers here are segmented copolyether-esters which contain long-chain segments, in general derived from poly(alkylene) ether glycols, and short-chain segments, derived from low molecular weight diols and dicarboxylic acids. Products of this type are known per se and described in the literature, for example in U.S. Pat. No. 3,651,014. Corresponding products are also commercially available under the designations Hytrel ® (Du Pont), Arnitel ® (Akzo) and Pelprene ® (Toyobo Co. Ltd.).

It is of course also possible to use mixtures of various rubbers.

As component F) the molding materials according to the present invention may contain from 0 to 45, preferably from 10 to 40, % by weight of fibrous or particulate fillers or mixtures thereof. Examples of fillers are carbon or glass fibers in the form of glass fabrics, glass mats or glass rovings, glass balls and also wollastonite.

Preferred fibrous reinforcing materials (component F) are carbon fibers, potassium titanate whiskers, aramid fibers and particularly preferably glass fibers. If glass fibers are used, their compatibility with the thermoplastic polyamide (A) or the modified polyphenylene ether (B) may be improved by treating them with a size and an adhesion promoter. In general, the carbon and glass fibers used have a diameter within the range from 6 to 20 μm.

These glass fibers may be incorporated not only in the form of chopped fiber but also in the form of continuous rovings. In the ready-produced injection molding, the average length of the glass fibers is preferably within the range from 0.08 to 0.5 mm.

Suitable particulate fillers (component F) are amorphous silica, asbestos, magnesium carbonate (chalk), pulverulent quartz, mica, talc, feldspar and in particular calcium silicates such as wollastonite and kaolin (in particular calcined kaolin).

Preferred combinations of fillers are for example 20% by weight of glass fiber with 15% by weight of wollastonite and 15% by weight of glass fiber with 15% by weight of wollastonite.

As well as the essential components A) to D) and the optional components E) and F) the molding materials according to the present invention may contain customary additives and processing aids G). The proportion thereof is in general up to 20, preferably up to 10, % by weight, based on the total weight of components A to E.

Customary additives are for example antioxidants, thermal stabilizers, UV stabilizers, lubricants, demolding agents, dyes, pigments and plasticizers.

Oxidation retarders and heat stabilizers which can be added to the thermoplastic materials of the present invention are for example halides of metals of group I of the periodic table, for example sodium, potassium or lithium halides, with or without copper(I) halides, for example chlorides, bromides or iodides. It is also possible to use zinc fluoride and zinc chloride. Other possibilities are sterically hindered phenols, hydroquinones, substituted representatives of this group and mixtures of these compounds, preferably in concentrations up to 1% by weight, based on the weight of the mixture.

Examples of UV stabilizers are various substituted resorcinols, salicylates, benzotriazoles and benzophenones, which in general are used in amounts up to 2% by weight.

Materials for enhancing the shielding from electromagnetic waves such as metal flakes, powders, fibers and conductive polymers can also be used.

Lubricants and demolding agents, which in general are added to the thermoplastic material in amounts up to 1% by weight, are stearic acid, stearyl alcohol, alkyl stearates, N-alkylstearamides and also esters of pentaerythritol with long-chain fatty acids.

Furthermore, it is advantageous to reduce the water imbibition of the polyamide by adding monophenolic compounds such as 2- or 4-t-butylphenol or dihydroxybiphenyls and derivatives thereof in amounts of up to 8% by weight.

Additives also include stabilizers which prevent the decomposition of red phosphorus in the presence of moisture and atmospheric oxygen. Examples are compounds of cadmium, zinc, aluminum, silver, iron, copper, antimony, tin, magnesium, manganese, vanadium, boron and titanium. Particularly suitable compounds are for example oxides of said metals and also carbonates or oxycarbonates, hydroxides and also salts of organic or inorganic acids such as acetates or phosphates or hydrogenphosphates and sulfates.

The thermoplastic molding materials according to the present invention are advantageously obtained by mixing the individual components at from 270° to 350° C. in customary mixing apparatus, such as kneaders, Banbury mixers and single-screw extruders, but preferably using a twin-screw extruder. To obtain as homogeneous a molding material as possible, thorough mixing is crucial. The order of addition of components can be varied, so that two or even three components may be premixed, but it is also possible to mix all the components together.

It is to be noted that the preparation of the molding materials may be accompanied by a reaction between the components A) to D), in particular between A) and B), so that the end product no longer represents a pure mixture of these components.

The molding materials according to the present invention are notable for excellent flame resistance properties but in particular for very high toughness.

They are suitable in particular for producing shaped articles by injection or extrusion molding, in particular for thermally stressed components in the automotive sector. In the latter sector it is of particular advantage that the components produced from the molding materials according to the present invention retain toughness even at low temperatures.

EXAMPLES

Component A

Polyhexamethyleneadipamide having a K value of 70; measured in a 1% by weight solution in 96% by weight sulfuric acid at 25° C. This K value corresponds to a relative viscosity of 2.5 or a viscosity number of 133 ml/g.

Component B/1

A modified polyphenylene ether of
90% by weight of poly(2,6-dimethyl-1,4-phenylene ether) ($\eta_{red}$=0.58, measured in a 0.5% by weight solution in chloroform at 25° C.),
9% by weight of polystyrene (melt flow index MFI at 200° C. under a load of 5 kg: 24 g/min),
1% by weight of fumaric acid
was prepared by mixing the components at 290°–310° C. in a twin-screw extruder with subsequent devolatilization. The melt was passed through a water bath, granulated and dried.

Component B/2

A modified polyphenylene ether of

88% by weight of poly(2,6-dimethyl-1,4-phenylene ether) ($\eta_{red}=0.63$, measured in a 1% by weight solution in chloroform at 25° C.), 10% by weight of polystyrene (melt flow index MFI at 200° C. under a load of 5 kg: 24 g/min), 2% by weight of maleic anhydride was prepared by mixing the components at 290°-310° C. in a twin-screw extruder with subsequent devolatilization. The melt was passed through a water bath, granulated and dried.

Component C/1

Red phosphorus of median particle size ($d_{50}$) of from 10 to 30 gm.

The phosphorus was phlegmatized with polyurethane (Astacin® Finish PUD, BASF Aktiengesellschaft). To this end 500 ml of aqueous-alkaline suspension of phosphorus containing 250 g of red phosphorus (particle size 0.001-0.4 mm) was heated to 60° C. and adjusted to PH 8 with 5% sulfuric acid.

Then 6.5 g of Astacin® Finish PUD (40% aqueous, anionic polyester-polyurethane dispersion prepared as described in DE-C3-26 45 779) were stirred in. The suspension was then stirred at 60° C. for 1 hour and thereafter filtered. The filter residue was washed with water and then dried in nitrogen at 100° C. The polyurethane content was 1% by weight.

Component C/2

Red phosphorus of median particle size ($d_{50}$) of 45 μm (Exolit® 385, Hoechst). The phosphorus contained 0.5% by weight of dioctyl phthalate as coating agent.

Component D/1

Four-block rubber (S—B—S'—B') having a styrene content of 42%, a butadiene content of 58% and a Shore A hardness of 87 (Tufprene® A from Asahi Chem)

Component D/2*

Three-block rubber (S—B—S') having a styrene content of 29%, a butadiene content of 71% and a Shore A hardness of 70 (Cariflex® TR 1102 from Shell)

Component D/3*

Three-block rubber (S—EB—S') having a styrene content of 29%, a hydrogenated butadiene content of 71% and a Shore A hardness of 75 (Karaton® G 1650 from Shell)

Component D/4*

Two-block rubber (S-EP) having a styrene content of 37%, a hydrogenated isoprene content of 63% and a Shore A hardness of 72 (Kraton® G 1701 from Shell)

Component G)

Zinc oxide

Preparation of Molding Materials

The components were mixed in a twin-screw extruder at a barrel temperature of 290° C. and extruded into a water bath. Component D was only added at the melt stage. After granulation and drying, specimens were injection molded for testing.

The following measurements were carried out:

| | |
|---|---|
| Izod notched impact strength ($a_k$) [kJ/m$^2$] | ISO 180/4A |
| Penetration energy ($W_s$) [Nm] | DIN 53 443 |
| Flammability test | UL-94 |

The flammability test was carried out as the Underwriters' Laboratories vertical burning test for classifying materials 94 V-0, 94 V-1 or 94 V-2.

A flameproofed thermoplastic is classed UL 94 V-0 if it meets the following criteria: in a set of 5 specimens measuring 127×12.7×3.2 mm there shall not be any specimens which burn with flaming combustion (flame height 19 mm) after each of two 10 second applications of the test flame. The total flaming combustion time for the 10 flame applications for each set of 5 samples must not exceed 50 s. There must not be any specimens which drip flaming particles, which burn up to the holding clamp or whose glowing combustion persists beyond 30 s. For classification as UL 94 V-1 the combustion times must not exceed 30 s and the total flaming combustion time for the 10 flame applications for each set of 5 specimens must not exceed 250 s.

Glowing combustion must never persist beyond 60 s. The other criteria are identical with those mentioned above. A material is classed as UL 94 V-2 if, while meeting the other criteria of UL 94 V-1, it does have specimens that drip flaming particles.

The compositions of the molding materials and the results of the measurements are revealed in the Table.

TABLE

| Examples | Composition of molding materials [% by weight] | | | | | $a_k$ [kJ/m$^2$] 23° C. | $W_s$ [Nm] | UL 94 (1/16') |
|---|---|---|---|---|---|---|---|---|
| I | 46 A | 40.6 B/1 | 2.7 C/2 | 10 D/1 | 0.7 G | 17 | 34 | V-O |
| I | 46 A | 40.6 B/1 | 2.7 C/2 | 10 D/2* | 0.7 G | 12 | 28 | V-O |
| II$^{a)}$ | 46 A | 40.6 B/1 | 2.7 C/2 | 10 D/3* | 0.7 G | 12 | 13 | Did not achieve classification* |
| III | 46 A | 40.6 B/1 | 2.7 C/2 | 10 D/4* | 0.7 G | 16 | 33 | Did not achieve classification |
| IV$^{b)}$ | 46.6 A | 41.7 B/2 | 2 C/1 | 10 D/2* | — | 15 | — | V-O |
| V$^{b)}$ | 46.1 A | 40.9 B/2 | 3 C/2 | 10 D/2* | — | 9 | — | V-O |

*For comparison
$^{a)}$Comparative example as per JP-A 63/089 567
$^{b)}$Comparative example as per EP-A 384 232

The novel combination of block copolymer and phosphorus in the molding materials achieves a V-0 classification coupled with good toughness. This is unexpected in that the block copolymer with the highest Shore A hardness gives the tougher moldings coupled with good flame resistant properties when combined with red phosphorus. When hydrogenated block copolymers (see Examples II and III) and low levels of phosphorus are used, classification under UL 94 is not possible.

We claim:

1. A flameproofed thermoplastic molding material comprising

A) from 5 to 93.5% by weight of a thermoplastic polyamide,
B) from 5 to 85% by weight of a polyphenylene ether, of which up to 40% by weight, based on B), may be replaced by an aromatic vinyl polymer,
C) from 0.5 to 20% by weight of red or black phosphorus,
D) from 1 to 20% by weight of a block copolymer which has a Shore A hardness >80 and has been formed from a conjugated diene and an aromatic vinyl compound,
E) from 0 to 15% by weight of an impact modifying polymer other than D),
F) from 0 to 45% by weight of a fibrous or particulate filler or a mixture of a fibrous with a particulate filler,
G) from 0 to 20% by weight of customary additives in effective amounts,
the percentages A) to G) adding up to 100%.

2. A flameproofed thermoplastic molding material as claimed in claim 1, comprising
A) from 30 to 71% by weight,
B) from 25 to 65% by weight,
C) from 1 to 10% by weight,
D) from 3 to 18% by weight.

3. A flameproofed thermoplastic molding material as claimed in claim 1, wherein the block copolymer D) is composed of at least two blocks of an aromatic vinyl polymer and at least one block of a conjugated diene polymer.

4. A flameproofed thermoplastic molding material as claimed in claim 1, wherein the block copolymer D) has the general formula A—B—A'—B', where A and A, are each an aromatic vinyl block and B and B' are each an elastomeric block of a conjugated diene.

5. A flameproofed thermoplastic molding material as claimed in claim 1, wherein the polyphenylene ether B) has been prepared from
$b_1$) from 70 to 99.95% by weight of a polyphenylene ether,
$b_2$) from 0 to 40% by weight of an aromatic vinyl polymer,
$b_3$) from 0.05 to 5% by weight of at least one compound which contains at least one doubt triple bond and at least one functional group selected from the group consisting of the carboxamides, epoxides, oxazolines and urethanes.

6. Flameproofed thermoplastic molding material as claimed in claim 5, wherein component $b_3$) is maleic acid, maleic anhydride or fumaric acid.

7. A shaped article produced from a molding material as claimed in claim 1.

* * * * *

UNITED STATES PATENT AND TRADEMARK OFFICE
CERTIFICATE OF CORRECTION

PATENT NO. : 5,260,359
DATED : Nov. 9, 1993
INVENTOR(S) : MUEHLBACH et al.

It is certified that error appears in the above-identified patent and that said Letters Patent is hereby corrected as shown below:

IN THE CLAIMS

Claim 4, column 14, line 6, "A and A" should read -- A and A'--.

Claim 5, column 14, line 17, "doubt" should read -- double or--.

Signed and Sealed this

Twenty-fourth Day of May, 1994

Attest:

BRUCE LEHMAN

Attesting Officer     Commissioner of Patents and Trademarks